Figure 1:
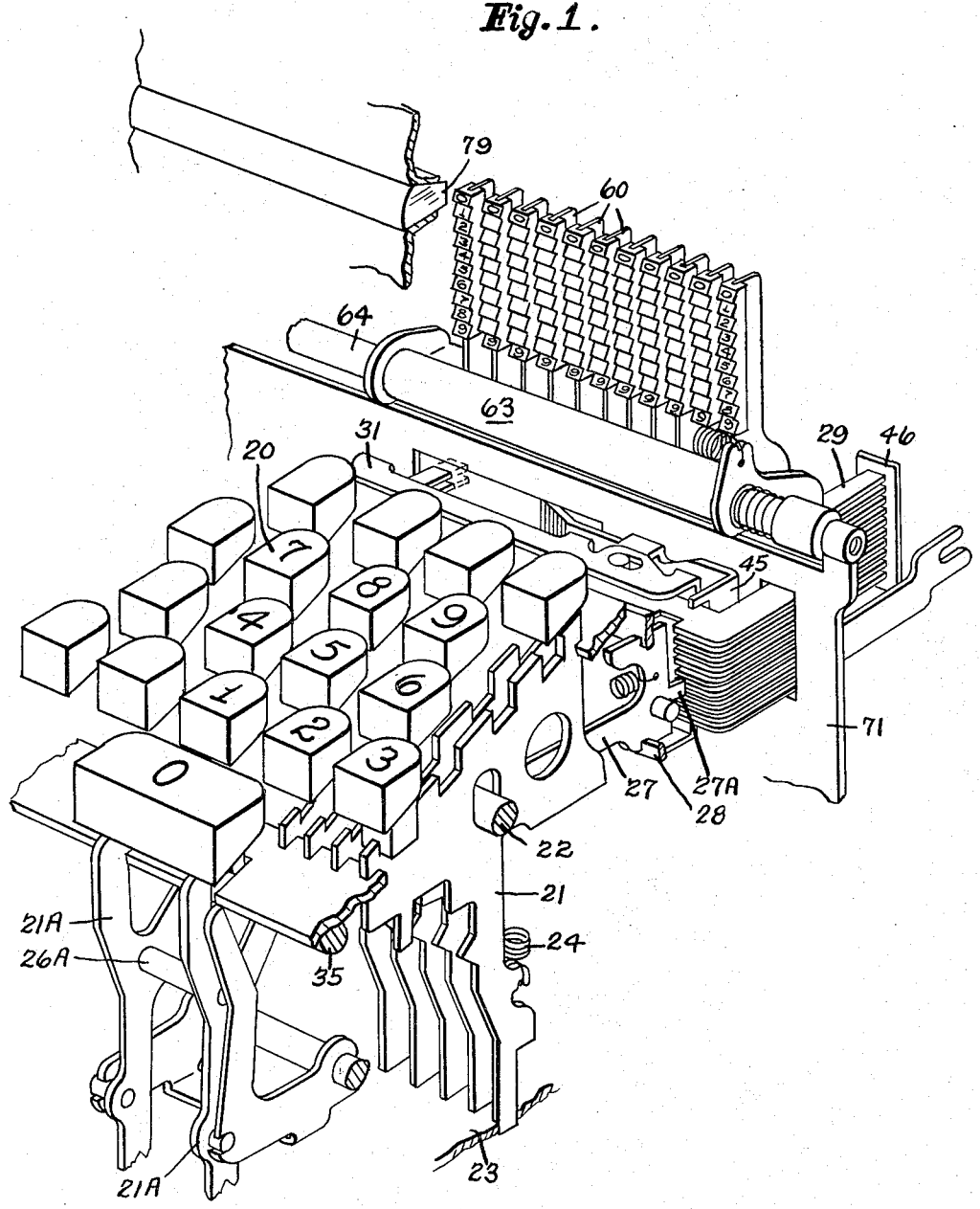

Dec. 3, 1963 G. K. CASPARI 3,112,873
KEY RESPONSIVE TEN KEY CALCULATOR WITH UNITARY
INDICATING AND LIMITING MECHANISM
Filed July 27, 1961 6 Sheets-Sheet 1

INVENTOR.
GEORG K. CASPARI
BY Gordon R. Sanborn
Attorney

INVENTOR.
GEORG K. CASPARI
BY Gordon R. Sanborn
Attorney

Dec. 3, 1963  G. K. CASPARI  3,112,873
KEY RESPONSIVE TEN KEY CALCULATOR WITH UNITARY
INDICATING AND LIMITING MECHANISM
Filed July 27, 1961  6 Sheets-Sheet 5

INVENTOR.
GEORG K. CASPARI
BY *Gordon A. Lambert*
Attorney

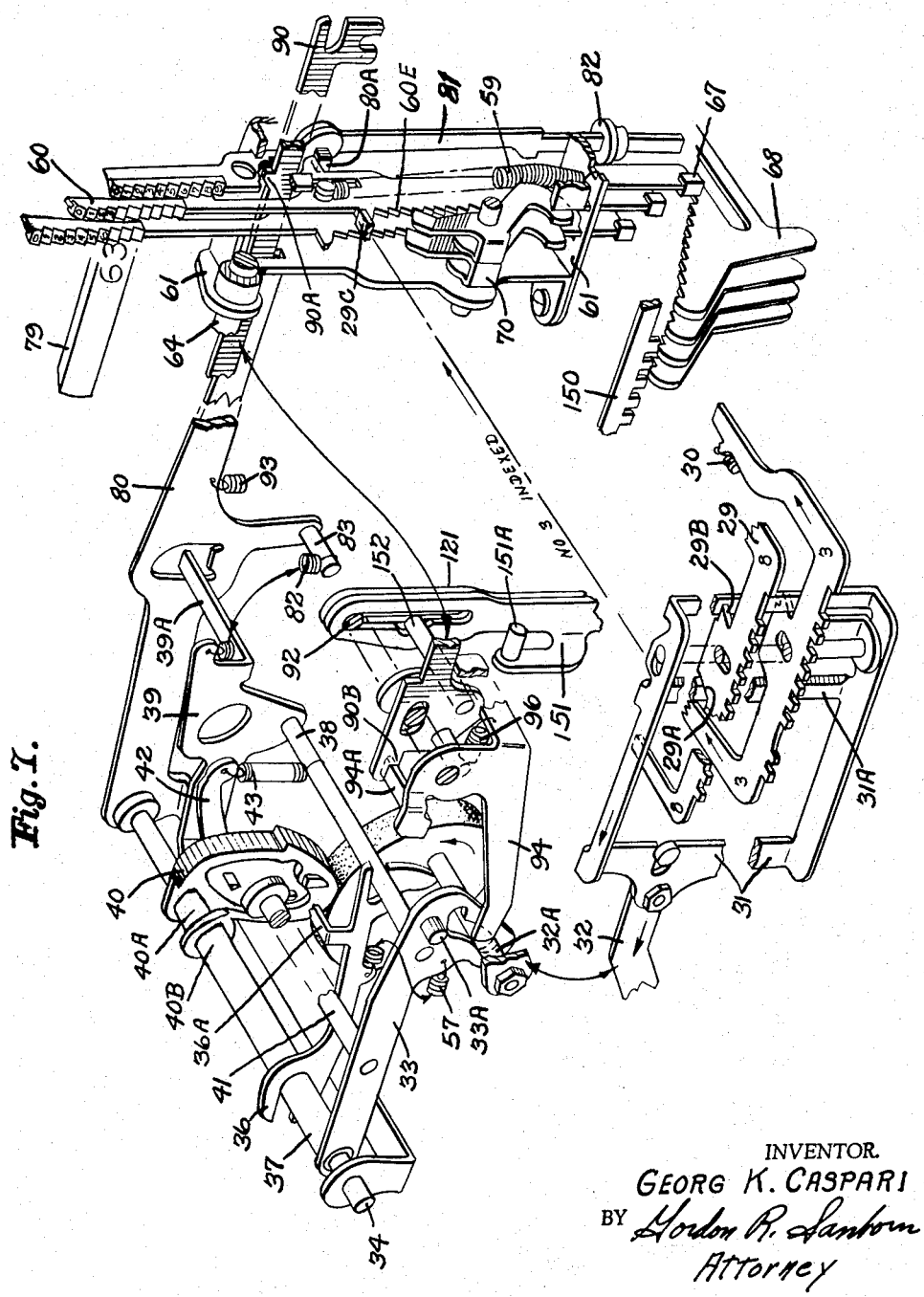
Fig. I.

United States Patent Office 3,112,873
Patented Dec. 3, 1963

3,112,873
KEY RESPONSIVE TEN KEY CALCULATOR WITH UNITARY INDICATING AND LIMITING MECHANISM
Georg K. Caspari, Detroit, Mich., assignor to Burroughs Corporation, Detroit, Mich., a corporation of Michigan
Filed July 27, 1961, Ser. No. 127,194
18 Claims. (Cl. 235—60)

The present invention relates to ten key calculating machines and more particularly to an improved indexing and amount indicating device for such machines.

In a ten key calculating machine a movable unit having a plurality of limiting elements therein for limiting the travel of the machine's add racks is stepped laterally in response to the sequential operation of numerical keys. The depression of the numerical keys serves to set one of the limiting members in the movable mechanism. In many prior art ten key calculating machines the movable mechanism is in the form of a pin carriage having one row of pins therein for each numerical order of the machine. The pins are movable from first to second positions in response to the operation of a numerical key so that when in a second position the moved pin serves to control the distance which an add rack in the machine can move. Ten key calculating machines in general have an inherent disadvantage in that once a numerical key has been depressed and released the operator no longer has available a visual indication of the amount which has been previously entered into the add rack limiting mechanism. Spring urged sensing devices have been previously provided for sensing the depressed pin in order to provide a visual indication of the amount indexed. However such devices generally are slow operating and greatly increase the number of parts in the machine.

Therefore it is an object of the present invention to provide an improved indexing device for a ten key calculating machine. Another object of the present invention is to provide an improved high speed amount entering mechanism for a ten key calculating machine which serves to control the movement of the add racks.

An additional object of the present invention is to provide an amount entering mechanism for a ten key calculating machine which serves to control the movement of the machine add racks and to simultaneously provide a visual indication of the amount entered. A further object of this invention is to provide an amount entering mechanism for a ten key calculating machine which includes a power driven device for providing the power needed to index an add rack limiting device and therefore reduce the force required to depress a key. Another object is to provide an amount entering mechanism in which the operator merely triggers a power mechanism to do the work, thereby removing any variations in the operation of the mechanism which might tend to depend upon the length of time an operator holds a key depressed.

These objects are achieved by the mechanism of the present invention which includes a plurality of movable indicating and limiting elements each of which is adapted to control the movement of an add rack and to provide a visual indication of the amount indexed. A single element is used in each order of the machine to limit an add rack and to provide a visual indication. A drive mechanism is provided to move each such element by a distance which is dependent upon the magnitude of the numerical key which is operated. In a preferred embodiment of the invention a continuously rotating power roll and snail-back cam arrangement similar to that used in commercially available electric typewriters is triggered by the operation of a numerical key. Thereafter the power roll and cam arrangement provides the power for moving the indicating and limiting element to a position representative of the numerical value of the operated key. As each key is depressed a carriage which supports the indicating and limiting elements steps to the left so that the elements are aligned with the proper orders of the add racks in the machine for transfer of the indexed amount into the register.

Figure 2:
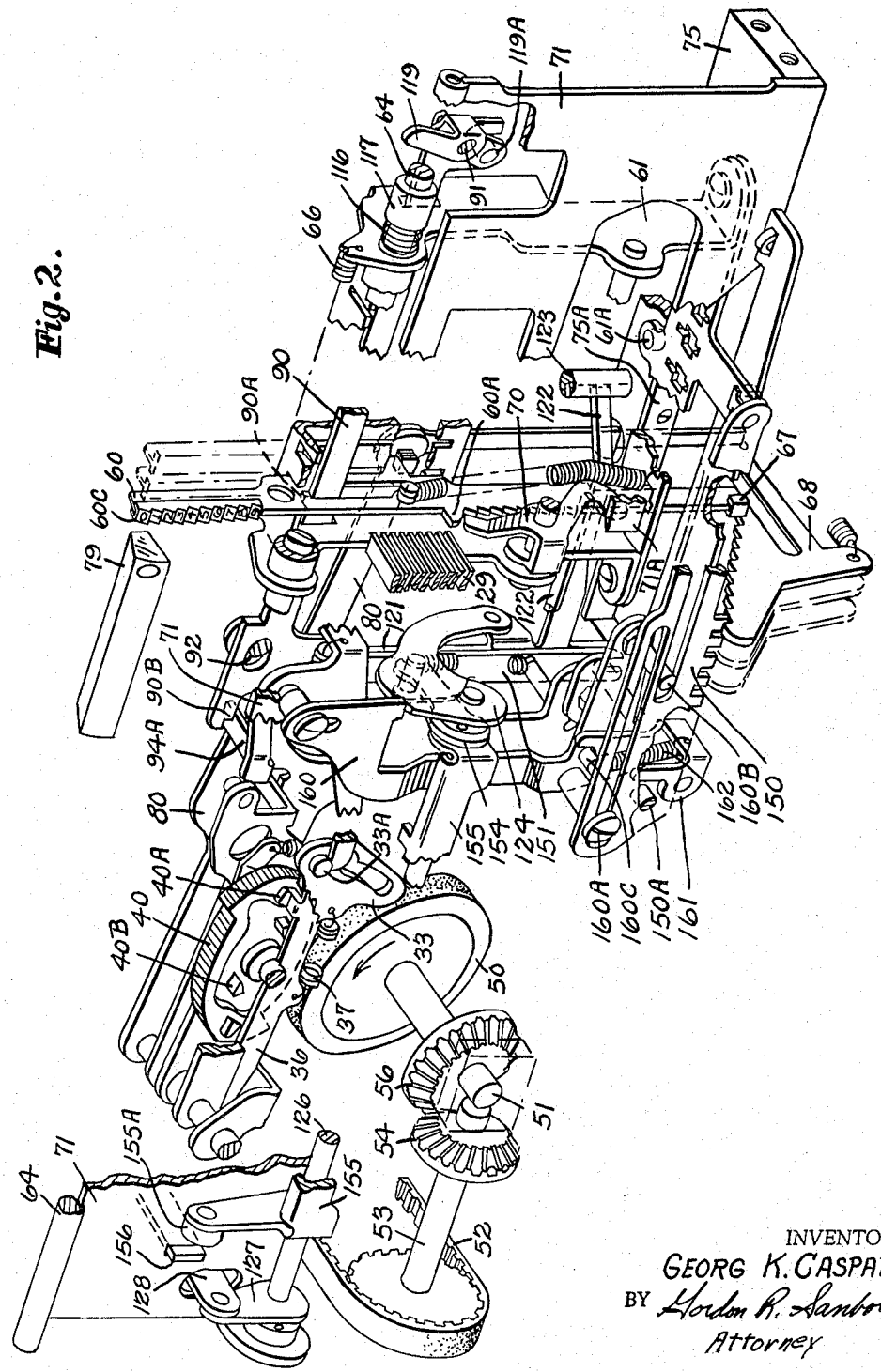
Figure 3:
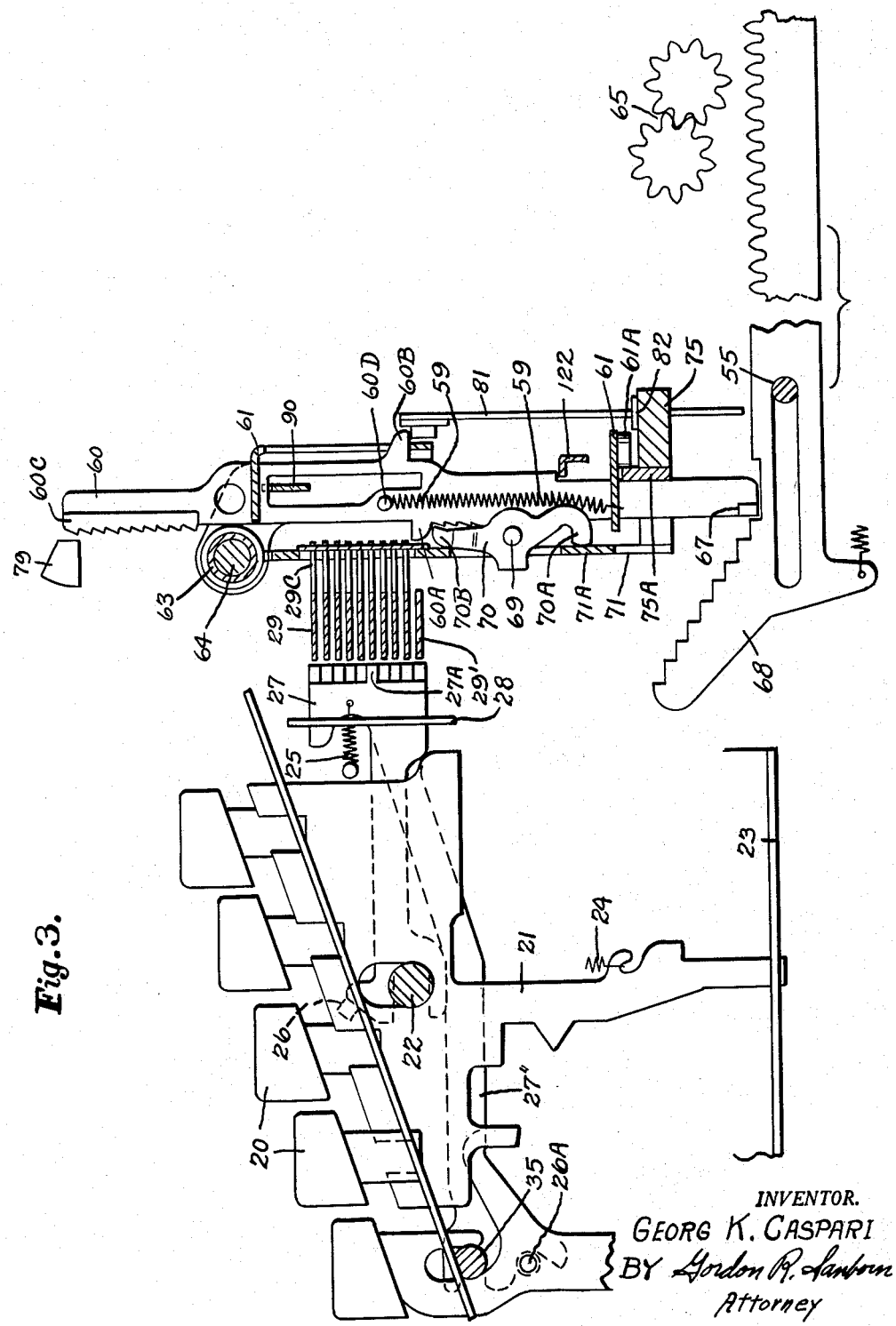
Figure 4:
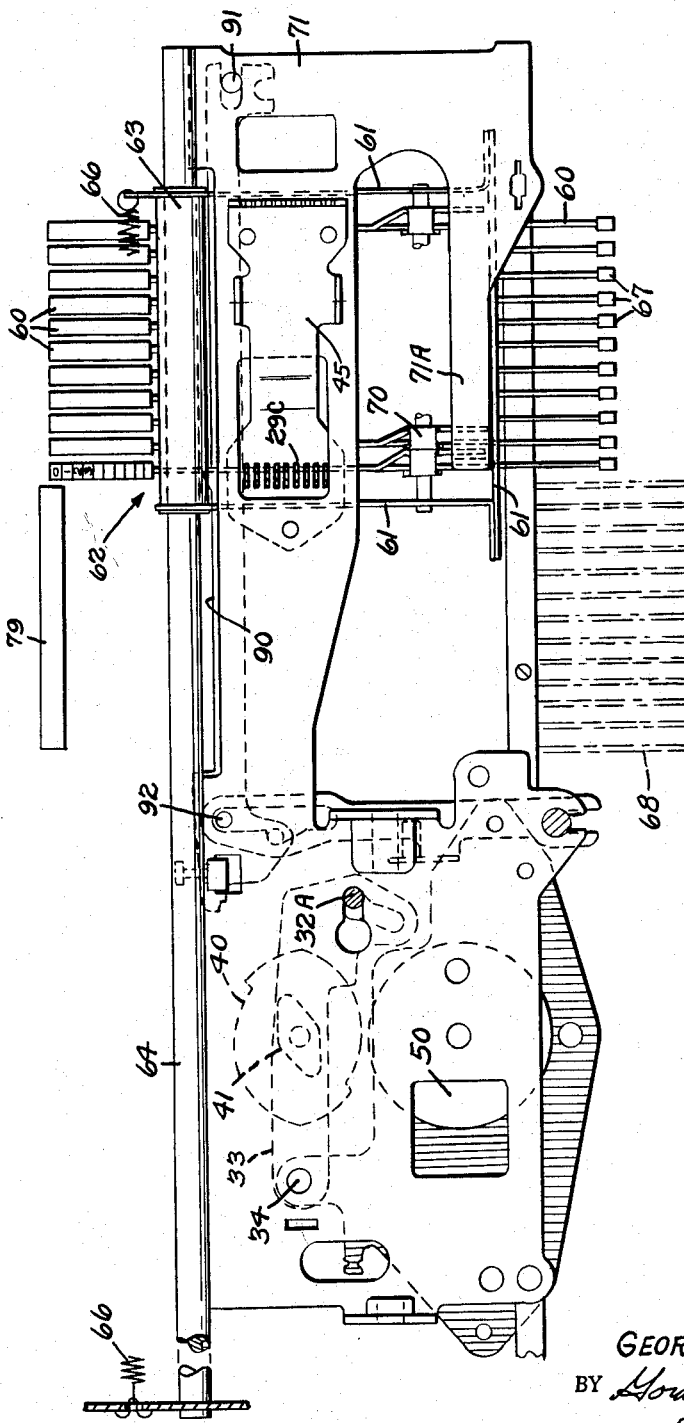
Figure 5:
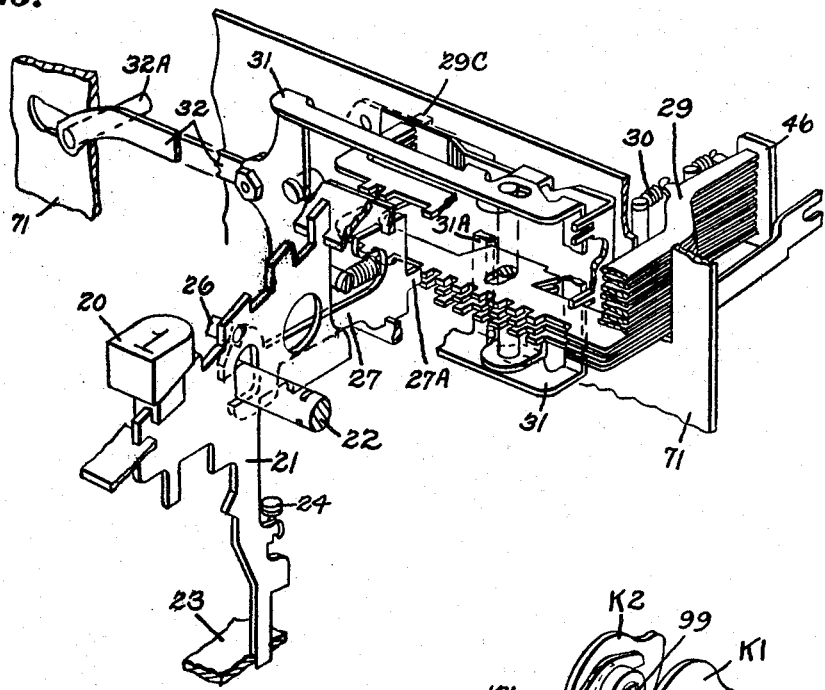
Figure 6:
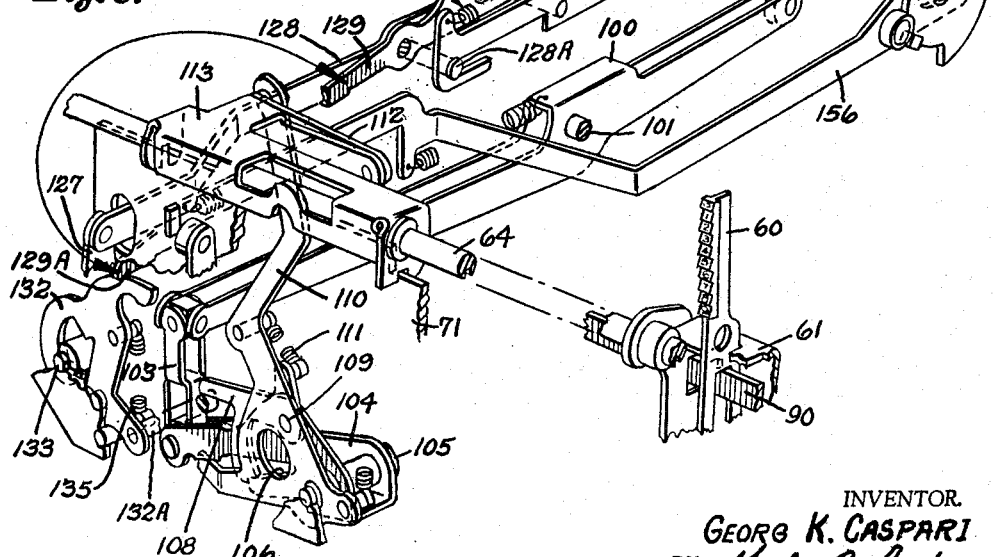

The above and other objects and advantages of the invention as well as the manner of operation of a preferred embodiment shown by way of example will be more clearly understood from the following description when read with reference to the accompanying drawings wherein, FIG. 1 is a perspective view from the right front corner of a portion of a ten key accounting machine keyboard having the ten numerical keys thereon, FIG. 2 is a perspective view of a portion of a power mechanism together with three orders of the indicating and limiting mechanism driven thereby, FIG. 3 is a right elevation showing one order of the indicating and limiting mechanism including an add rack which is controlled by a limiting element, FIG. 4 is a front view of the carriage which supports the indicator elements together with the supporting frame and shaft for the carriage, FIG. 5 is a perspective view of a single numerical key together with the mechanism directly operated thereby during an amount entering operation, FIG. 6 is a perspective view of the power cams and linkages driven thereby for restoring the indicator carriage to its home position following an amount entering operation, and FIG. 7 is a perspective view with the indicator drive apparatus being partially spread and with the parts moved to the various positions assumed when the number 3 key has been operated.

In the following description the positions and movements of the various parts will be described as observed by a person in front of, above, or on the right-hand side of the mechanism when in the machine.

Referring now to the drawings and in particular to FIGS. 1 and 3 there is shown the right end of the keyboard for a combination typing and calculating machine. The typewriter keys are included in this view merely to illustrate the position of the ten numerical keys when the invention is used with a combination calculating and typing machine. It will be seen in FIG. 1 that nine of the ten numerical keys 20 (1–9) are each associated with a keystem 21 supported by a shaft 22 and a slotted bottom plate 23 in a manner such that each keystem is supported for movement in a vertical plane. Individual springs 24 are associated with each keystem and serve to urge each to its uppermost position. Each of the keystems 21 is provided with a plurality of vertical lugs along its upper surface for receiving a key. Thus each of the keystems 21 will be identical and hence the manufacturing cost thereof reduced. The support for the "0" key includes a pair of parallel keystems 21A which are somewhat different from those for the other keys but the manner of operation thereof is substantially identical. That is, the "0" key is supported for movement in a vertical direction and is spring-urged upwardly. As seen in FIG. 3 the "0" keystems are guided by a shaft 35. Each of the keystems 21 has a leftwardly extending rectangular lug 26 which is disposed at an angle such that one of the flat surfaces thereof is adaptable to the angled cam surface on the upper front end of an associated horizontal slide 27 supported adjacent to the left side of each keystem. The "0" keystems 21A are interconnected by a small shaft 26A which serves the same purpose as the lugs 26 on the keystems 21 by being engaged with the cam surface provided in the front end of a horizontal slide 27' which is supported for movement under the control of the "0" key. The slides 27 and 27' are supported by a vertical slotted frame 28 and by grooves in the shaft 22, each slide being urged to its forward position by a spring 25. Since the slides 27 and 27' are limited to horizontal movement the operation of an associated key serves to cam one of the slides rearwardly.

Each of the slides 27 and 27' has a single rearwardly extending lug 27A which is aligned with one of the lugs extending forwardly along the front edge of the horizontal indexing slides 29. These are nine indexing slides 29 each of which is controlled by one of the numerical keys 0–8 and a single indexing slide 29' controlled by the "9" key. The slides 29 and 29' are supported by a small stationary plate 46 and by the small plate 45 (FIG. 1) secured to the front surface of a main stationary frame 71. The slides 29 and 29' are thus supported for movement in parallel horizontal planes. The shape of each of the slides 29 is substantially identical and is more clearly seen in FIG. 7 wherein one of the springs 30 which serves to urge the slides 29 and 29' forwardly is seen. The slotted frame 28 which supports the rear ends of the slides 27 is supported in a manner such that it can be selectively moved in a horizontal direction so that the lugs 27A can be selectively aligned with the lugs on the front edges of the slides 29. When the frame 28 is in a position such that the lugs 27A are aligned with the lugs on the slides 29 and 29' the operation of a numerical key will move one of the slides 29 or 29' rearwardly. This is the normal operation of the numerical keys for operating the indicating and add rack limiting mechanism. When the frame 28 is moved to the left the lugs 27A will pass between adjacent lugs on the slides 29 and 29' when a numerical key is operated. Accordingly the keyboard including the numerical keys has a particular advantage since the numerical keys can operate in a dual mode. That is, the numerical keys can be used to control the typewriter without effecting operation of the amount indicating and limiting mechanism or they can be used to control the operation of the indicating and limiting mechanism merely by selectively positioning the rear ends of slides 27 through the movement of frame 28. The slots in shaft 22 which receive the slides 27 are slightly oversize to permit a small angular movement of the slides in a horizontal plane when the frame 28 is shifted.

Each slide 29 and 29' is provided with a cam surface 29A and a latching surface 29B (FIG. 7), with the cam surface 29A being disposed adjacent to a chamfered edge of a vertical bar 31A which is an integral part of a small movable frame 31. Each of the slides 29 has a rearwardly extending portion 29C which as described hereinafter serves to limit the extent of movement of an indicator and add rack limiting element. As will be seen from FIG. 3 and as described hereinafter the slide 29' does not have such a rearwardly extending portion 29C, but otherwise the slide 29' is the same as the slides 29.

The relationship of the cam and latching surfaces 29A and 29B on the slides 29 and 29' (FIG. 7) is such that when one of the slides 29 and 29' is moved rearwardly the cam surface 29A drives the frame 31 to the left. Movement of the frame 31 to the left brings the right vertical edge thereof behind the angled latching surface 29B on the operated slide to hold such slide in its rearward position even though the operator releases the numerical key. Conventional interlocks prevent the simultaneous operation of more than one numerical key. Leftward movement of the frame 31 brings the right vertical surface thereof behind the horizontal portion of the nonoperated slides 29 and 29' to thereby prevent operation of another numerical key while the frame 31 is in its left-hand position. Accordingly it is seen that when a numerical key is depressed a single slide 29 is moved rearward and the frame 31 is moved to the left.

A leftwardly extending link 32 adjustably secured to the left side of frame 31 carries a rearwardly extending stud 32A which is disposed in the upper end of an arcuate slot provided in the right end of a lever 33 secured to sleeve 37 on shaft 34 (FIG. 7). The rear end of the stud 32A is maintained in engagement with the right end of a cam control slide 36 supported by the sleeve 37 to which lever 33 is secured and by a rearwardly extending shaft 38 which interconnects the lever 33 with a lever 39 secured to the rear end of the sleeve 37. Slide 36 has a rearwardly extending lug 36A which serves to control a snail-back cam 40 supported on a shaft 41 extending between the levers 33 and 39. The cam 40 is provided with two sets of control lugs 40A and 40B with the rearwardly extending lug 36A of the slide 36 being normally engaged with a lug 40A (as shown in FIG. 2).

A lever 42 (FIG. 7) pivoted on the sleeve 37 is urged in a clockwise direction by a spring 43. The lever 42 is engaged with a diamond shaped cam surface on the left side of the cam 40 (FIG. 4) so that the cam 40 is constantly urged in a clockwise direction against the lug 36A.

A rubber power roll 50 supported by shaft 51 is constantly driven in a counterclockwise direction by a continuously running electric motor (not shown) which operates through the belt 52, shaft 53 and beveled gears 54 and 56 (FIG. 2). The slide 36 is urged to the right by a spring 57 (FIG. 7) so that its lug 36A normally engages a lug 40A and hence holds the cam 40 away from the power roll 50. When a key is depressed the leftward movement of the frame 31 causes the slide 36 to be moved to the left and hence the lever 42 is effective to rock the cam 40 clockwise to bring it into engagement with the power roll 50. Thereafter the cam 40 is positively driven in a clockwise direction on shaft 41. As a result the levers 33 and 39 are driven counterclockwise around shaft 34 which provides the necessary power for moving an indicating and limiting element to the proper position. The shape of the slot in the right end of lever 33 which receives the stud 32A is such that as soon as the lever 33 is rocked counterclockwise the frame 31 is positively held in its leftward position. As a result the slide 36 is held to the left where its rearwardly extending lug 36A is in a position to engage one of the lugs 40B on the cam 40. The lug 40B is disposed radially inward and slightly clockwise on the cam with respect to the associated lug 40A. Thus with the slide 36 held to the left the cam 40 is only able to rotate through approximately 160° before the lug 36A engages a lug 40B and prevents continued engagement of the cam with the power roll 50. As the cam 40 approaches 160° of rotation the levers 33 and 39 return clockwise to their home positions illustrated in FIG. 2 and hence the stud 32A is in a position at the top of the cam slot in lever 33. Accordingly spring 57 extending from lever 33 to slide 36 tends to pull the slide 36 to the right and return the frame 31 to its rightward position. If the operated key is held depressed the stud 32A will hold the slide 36 to the left with the lug 36A being engaged with the lug 40B so that a repeat operation will not occur. When the operated key is released spring 57 will pull the slide 36 and hence the frame 31 to the right to their home positions of FIG. 2. As the slide 36 moves to the right the lug 36A thereon moves into the path of a lug 40A, the cam 40 is moved slightly clockwise by the lever 42 to bring the lug 40A against lug 36A, and thus the mechanism is returned to its initial condition. The cam 40 thus rotates approximately 180° for each complete amount indexing operation.

The above described power drive of the levers 33 and 39 in response to the depression of a numerical key is utilized to drive an indicating and limiting element to its indexed position. In the preferred embodiment of the invention illustrated herein, the indicating and limiting elements are in the form of vertical slides or bars 60 referred to as indicator bars. The indicator bars 60 are supported for vertical movement in the frame 61 of a carriage 62. As seen in FIG. 2 the lower horizontal part of frame 61 has T-shaped slots therein to receive the bars 60, and the upper horizontal part of frame 61 is slotted to serve as a guide for each bar. The carriage also includes a sleeve 63 disposed about a stationary shaft 64. The lower portion of the frame 61 carries a roller 61A (FIGS. 2 and 3) which is adapted to ride against the vertical steel plate 75A which is secured to the front edge of the stationary block 75 to which the main frame 71 is secured. Thus the shaft 64 provides the main support for the carriage 62 while the roller 61A through its engagement with the steel plate 75A prevents clockwise rotation of the carriage about the shaft 64. An escapement spring 66 (FIG. 4) urges the carriage 62 to the left. Each of the indicator bars 60 has a plastic number bearing element 60C secured to the upper front edge thereof, said plastic elements 60C each having ten flat surfaces with a number imprinted on each surface (FIG. 1).

The lower end of each of the indicator bars 60 is provided with a limiting lug 67 which is engageable by the stepped front end of one of the plurality of add racks 68 which serve to transfer the amounts from the indexing and indicator unit to an accumulator 65. Each indicator bar 60 is urged to its lowermost position in the carriage 62 by means of the individual springs 59 extending from the bottom horizontal part of carriage frame 61 to a rightwardly extending stud 60D on the associated indicator bar. The carriage 62 includes a horizontally extending shaft 69 which carries a plurality of pawls 70 each of which is engageable with the notched or saw-toothed latching surfaces 60E on the lower front edges of the associated indicator bar 60. Each pawl 70 has a downwardly extending tail portion 70A, the rear edge of which is engaged with the spring 59 of the associated indicator bar 60. The space between adjacent bars 60 is substantially the same as the diameter of each spring 59. Therefore each pawl 70 is urged in a clockwise direction on the shaft 69, but with the carriage in its rightward position the lower front ends of the tails 70A are urged against the rear surface of the leftwardly extending lug 71A on the stationary frame 71. As a result the latching noses 70B on the upper ends of the pawls 70 are held away from the latching surfaces on the indicator bars when the carriage 62 is in its home position. As the carriage 62 and the indicator bars carried thereby escapes to the left in the manner hereinafter described the pawls 70 are successively released from lug 71A to rock clockwise into engagement with the associated indicator bar. The shape of the latching surfaces 60E on the indicator bars is such that the pawls 70 merely act as by-pass pawls during the time that an associated indicator bar is being elevated and therefore they do not prevent such upward movement of the indicator bars. However after the associated indicator bar 60 has reached its maximum extent of upward travel and the associated spring 59 starts to move it downwardly the pawl 70 engages one of the latching surfaces to thereby hold the indicator bar in an elevated position. The spacing of the latching surfaces 60E with respect to the noses 70B on pawls 70 is such that when an indicator bar is limited in its upward travel there is sufficient space to insure movement of the pawl into latching position. It will be seen from FIG. 4 that a given pawl 70 will only become engaged with the associated indicator bar 60 when the carriage 62 has escaped to the left by a distance sufficient to move the lower end of said given pawl to the left of the left end of the stationary lug 71A.

The left rear ends 29C of the slides 29 are normally disposed to the front of the front edge of the lugs 60A on the indicator bars 60 (FIG. 3). The slides 29 are vertically spaced so that when a given slide is moved rearwardly by the operation of a numerical key the vertical distance between the lug 60A and the portion 29C of the operated slide 29 is proportional to and representative of the numerical value of the operated key. The slide 29′ controlled by the number "9" key is the lowermost slide and as seen in FIG. 3 does not have a rearwardly extending portion for limiting the travel of an indicator bar. When the "9" key is operated an indicator bar is allowed to move upwardly until its rearwardly extending lug 60B engages the upper portion of carriage frame 61. The nine other slides 29 are arranged in ascending order from "0" through "8." For purpose of illustration the number "3" slide is illustrated in FIG. 7 as having been moved rearwardly to thereby limit the upward travel of an indicator bar 60.

As seen in FIG. 4 the left rear ends 29C of the slides 29 are positioned in alignment with the indicator bar 60 nearest to the left end of lug 71A. Therefore if the indicator bar 60 which is adjacent to the left end of the lug 71A is driven upwardly the extent of its upward movement will be controlled by the engagement of its lug 60A with the left rear end 29C of the operated slide 29 (or by the engagement of lug 60B with the upper part of frame 61 in the case of a nine). If at the same time the carriage 62 escapes to the left to render the associated pawl 70 operable said pawl will rock clockwise as soon as it is clear of the lug 71A and hence will prevent downward movement of the elevated indicator bar 60. As a result the elevated indicator bar will have moved upward by a distance corresponding to the value assigned to the moved slide 29 or 29′ and will be held in such position by an associated pawl 70. Therefore the lower end of the indicator bar 60 will serve to properly control the rearward travel of an add rack 68 while at the same time provide a visual indication of said amount. A transparent indicating window 79 secured in the machine case is so positioned that as the carriage 62 escapes to the left the elevated indicator bars move into the field of view thereof with only a single one of the indicating surfaces on each indicator bar being visible within the window 79.

The power for driving the indicator bars to their elevated numerical representing positions is derived from the power roll and cam arrangement previously described and includes the driving lever 80 (FIGS. 2 and 7) which is in the form of a bellcrank lever pivoted on the shaft 34. The right end of the driving lever 80 has a hole therein through which a forwardly extending rectangular lug 80A passes. Lug 80A, carried at the upper end of a guide link 81, is engageable with the rearwardly extending lug 60B provided on each of the indicator bars 60 and is aligned with the indicator bar 60 positioned adjacent to the left end of lug 71A of frame 71. The arrangement of the lever 80 and link 81 is such that when lever 80 is driven counterclockwise the lug 80A will be elevated but its upper surface will remain horizontal during such upward movement. The lower end of the link 81 passes through a grommet 82 disposed in the stationary frame.

As seen in FIG. 7 the lever 80 is coupled with the lever 39 by means of a spring 82 which is connected to the lever 39 and to the forwardly extending stud 83 on the lever 80. Accordingly when the lever 39 rocks counterclockwise in response to the rotation of cam 40 by the power roll, the drive lever 80 will be pulled counterclockwise. Therefore the indicator bar 60 which is aligned with the rectangular lug 80A will be driven upwardly until its forwardly extending lug 60A engages the left rear end 29C of the indexed slide 29. It should be noted that the levers 33 and 39 (FIG. 7) are positively driven a fixed distance as the cam 40 is driven by the power roll, such distance being great enough to pull the drive lever 80 through an angle sufficient to elevate an indicator bar to its "9" position. The spring 82 thus serves to provide a yielding joint between the lever 39 and the drive lever 80 so that the lever 39 can continue its driving movement even though lever 80 comes to a stop as a result of the active indicator bar 60 coming into engagement with an indexed slide 29.

Each of the indicator bars 60 has its central portion cut away to receive a horizontally extending escapement slide 90 which as seen in FIGS. 2 and 4 is supported by stationary studs 91 and 92. The escapement slide 90 has a single vertical lug 90A thereon which is engageable with each of the indicator bars when said indicator bars are in their lowermost positions. However as soon as an indicator bar is elevated by the drive lever 80 in response to the indexing of an amount the operated indicator bar loses engagement with the lug 90A. The escapement spring 66 constantly urges the carriage 62 to the left, and the only thing which prevents such leftward movement of the carriage is the engagement of an indicator bar with the lug 90A. It is therefore seen that as soon as an indicator bar 60 is driven upwardly by the drive lever 80 the carriage 62 will move to the left to bring the next indicator bar to the right into engagement with the lug 90A. It should be noted with reference to FIG. 3 that when the zero key is operated the lowest slide 29 controlled thereby allows the indicator bar 60 to be elevated by a small amount by the lever 80. This permits the escapement to take place, after which the operated bar 60 returns to its lowered zero indicating position.

Since the escapement of the carriage 62 might occur prior to the time that the spring 93 is effective to return the drive lever 80 to its lowered position where the lug 80A is beneath the next indicator bar lug 60B, the complete escapement of the carriage 62 is prevented until the drive lever 80 has returned to its lowermost position. To accomplish this the left end of the escapement slide 90 is provided with a stepped surface 90B which is engageable with a rearwardly extending lug 94A of the bellcrank lever 94 (FIG. 7) pivoted on stud 92. As seen in FIG. 2 the lug 94A is positioned below the left end of the escapement slide 90 when the carriage 62 has completed its escapement and the parts are in position for the next amount entering operation. When a key is depressed and an indicator bar is elevated the carriage 62 is not only pulled to the left by the escapement spring 66 but the escapement slide 90 is urged to the right by a spring 96 connected to the lower and rearwardly extending lug on the bellcrank lever 94. As a result of the slight rightward movement of the escapement slide 90 which takes place as soon as an indicator bar is elevated the bellcrank lever 94 rocks clockwise to its FIG. 7 position where its rearwardly extending lug 94A is positioned in the path of the stepped portion on the left end of the escapement slide 90. The mass of the escapement slide is small compared to the mass of the carriage and therefore the slide 90 always moves to the right by an amount sufficient to allow the lug 94A to move into latching engagement with the slide 90 prior to the time that the carriage 62 moves far enough to bring the following indicator bar into engagement with the lug 90A on the escapement slide. Since the slide 90 is latched to the right of its home position the escapement of the carriage is not completed in a single motion. The escapement slide 90 is then held slightly rightward of the full escapement position until the drive lever 80 for the indicator bars returns to its normal position. The lever 39 has a rearwardly extending lug 39A which passes through an opening provided in the drive lever 80. The arrangement is such that when the lever 39 returns clockwise to its home position in response to cam 40 moving to its low portion the lug 39A engages the lever 80 to remove the counterclockwise urge thereon and allow spring 93 to pull lever 80 to its normal position.

The leftwardly extending arm of the lever 94 underlies the forwardly extending stud 33A on the lever 33. Accordingly when the lever 33 (and hence the lever 39 and drive lever 80) returns to its home position the stud 33A rocks the bellcrank lever 94 counterclockwise. This moves the lug 94A downward to release the escapement slide 90. The escapement spring 66 is stronger than the spring 96 which urges the escapement slide 90 to the right and therefore as soon as the bellcrank lever 94 releases the slide 90 the carriage 62 and the slide 90 move together to the left to complete the escapement. Accordingly the lug 80A on the drive lever 80 is always returned to its lowered position for engagement with the succeeding indicator bar before the carriage completes its escapement. The width of the lug 80A is such that it remains aligned with a given lug 60B until the second half of the escapement operation occurs. At that time the operated bar 60 moves to the left beyond lug 80A and the lug 60B of the next bar 60 becomes aligned with the lug 80A.

The operation of the mechanism in response to the depression of a numerical key is as follows. The depression of a key 20 causes a slide 29 (or the slide 29' if the nine key is operated) to be moved rearwardly where its left rear end 29C is in the path of an indicator bar lug 60A. The rearward movement of the slide 29 cams the frame 31 to the left. As a result the stud 32A moves the slide 36 to the left causing the cam 40 to be released for a slight clockwise rotation under the urge of the lever 42 and spring 43 (FIG. 7). Such clockwise movement of cam 40 brings the serrated edge thereof into engagement with the continuously rotating power roll 50 and hence the cam 40 is driven positively in a clockwise direction on its supporting shaft 41 carried by levers 33 and 39. As a result thereof the levers 33 and 39 are driven counterclockwise to pull the drive lever 80 in a counterclockwise direction. The lug 80A engages the rearwardly extending lug 60B on the indicator bar 60 which is aligned therewith causing said indicator bar to be driven upwardly until its forwardly extending lug 60A engages the moved slide 29. As soon as the indicator bar moves upward a small distance the carriage 62 is released from the lug 90A on the escapement slide and spring 66 becomes operative to pull the carriage to the left for the first part of the escapement operation. As a result the pawl 70 associated with the indicator bar 60 being driven upward clears the left end of the lug 71A on the frame 71 so that its spring 59 is effective to rock said pawl clockwise. The pawl 70 then operates substantially as a by-pass pawl in that it allows the indicator bar to continue its upward movement. As soon as the drive lever 80 starts toward its home position after having driven the indicator bar to a height determined by a slide 29, the pawl 70 moves into one of the latching surfaces on the lower front edge of the indicator bar and prevents continued downward movement of the bar under the urge of the spring 59. The upward movement of the indicator bar further serves to release the escapement slide for rightward movement under the urge of spring 96 (FIG. 7). Accordingly the lever 94 rocks clockwise and serves to latch the escapement slide in its rightward position and hence prevent a full escapement of the carriage 62. Thereafter the downward movement of the lever 33 serves to rock bellcrank lever 94 counterclockwise to release the escapement slide 90 and allow the escapement of carriage 62 to be completed. During the time that the lever 33 was moved counterclockwise from its home position the arcuate slot in the end thereof which encompasses the stud 32A served to hold said stud 32A and the frame 31 in their leftward positions. Accordingly the slide 36 is held in its leftward position as long as the lever 33 is displaced from its home position. As a result the lug 36A on the slide 36 is held in a position where it will engage the lug 40B on the cam 40 as the cam nears 160° of rotation. Thus the slide 36 prevents re-engagement of the cam 40 with the power rolls 50. Thereafter as the lever 33 returns to its home position the stud 32A becomes positioned in the upper horizontal portion of the slot in lever 33 so that the spring 57 for the frame 31 is effective to pull the frame 31 to the right. As the frame 31 and slide 36 move to their rightward positions under the urge of spring 57 the lug 36A becomes engaged with the lug 40A on the cam 40. The rightward movement of frame 31 serves to release the operated slide 29 which returns to its forward position under the urge of its associated spring 30.

It should be noted that in the event the operator holds the operated key depressed the frame 31 will be held to the left even though the lever 33 returns to its home position. Accordingly the slide 36 is held to the left and the cam 40 is prevented from re-engaging the power roll. Thus the previously operated key must be released before a new amount entering cycle of operation can occur.

From the above it is seen that the indicator bars 60 are driven upwardly by an amount determined by the vertical position of the slide 29 which is moved rearwardly. The vertical spacing between the adjacent slides 29 corresponds to the height of the steps on the front end of the add racks 68 which serve to transfer the amounts into the register 65. The details of the register 65 and the control mechanism associated therewith for engaging and disengaging the pinions thereof with the add racks is not included herein since such mechanism is well known in the art and forms no part of the present invention. As previously noted with respect to FIG. 3, the bottom slide 29' does not have a portion which extends rearwardly for engagement with a lug 60A on the indicator bars (although such an arrangement could clearly be used). The bottom slide is controlled by the number "9" key and in the embodiment illustrated the nine position for the indicator bar is determined by the indicator bar being elevated to its maximum height where it is limited by engagement of the lug 60B with the frame 61. It should also be noted that when the indicator bars are in their lowermost positions as illustrated in FIG. 3 the "0" indicating surface is in vertical alignment with the window 79 but is not visible therein until the carriage 62 escapes to the left. With the indicator bars in the position shown in FIG. 3 the lugs 67 on the lower ends thereof serve to hold the add racks 68 in their home positions. When the indicator bars are elevated to their number "8" positions as controlled by the top slide 29 the lugs 67 engage the top step on the add racks 68, while movement of the indicator bars to their maximum height places the lugs 67 above the steps on the add racks 68. Thus when a "9" is entered by movement of the slide 29' rearward the active indicator bar 60 moves to its uppermost position. With the indicator bar elevated to the "9" position the lug 67 is above the last step on the add rack 68 and hence such add rack is limited to nine units of movement by a stationary cross-shaft 55. As previously explained, the bars 60 are overdriven by a small distance to insure latching thereof by the associated pawl, and are then pulled down by a spring 59 into engagement with a pawl 70.

After all of the digits in a given number have been entered into the indicator and rack limiting unit the main portion of the calculating machine is rendered operable by conventional control keys so that the add racks 68 will be moved rearwardly by extents limited by the bars 60. As is well known in the art, after the add racks have been moved to their differential positions representing the amount indexed, the device which has served to limit the add rack movement generally serves no further useful function and accordingly can be returned to its home position. However in most prior art machines which utilize conventional pin carriages to limit the travel of the add racks the drive of the pin carriage to its home position must be delayed until near the end of the accounting machine cycle of operation since early homeward travel of the pin carriage would cause an interference between the add racks and the pins. Accordingly in such prior art machines the pin carriage restoring operation is delayed until near the end of the accounting cycle and as a result the time allotted for driving the pin carriage to home position is relatively short. The mechanism of the present invention means is provided for elevating each of the active indicator bars to their "9" positions once the add racks have sensed the amounts represented thereby. Thus the carriage 62 can be driven to its home position as soon as the add racks have sensed the amounts in the indicator bars. This allows more time for the carriage restoring operation. The mechanism for returning the carriage to its home position as well as an improved mechanism for moving the carriage to a position such that an amount indexed in the unit can be retained during a total or subtotal operation will now be described.

A carriage restoring cam K1 (FIG. 6) is secured to the main shaft 99 of the accounting machine with which the indicator and rack limiting mechanism is used. The mechanism for driving the main driveshaft through 360° in response to the operation of an operation control key is well known in the art and hence further details thereof are not included. A lever 100 pivoted on shaft 101 and carrying a roller 102 which is engaged with the cam K1 is coupled with a vertical connecting link 103 at its front end. The lower end of link 103 is pinned to the left end of bellcrank lever 104 pivoted at 105 and having a power lug 106 formed as a part thereof. A pawl 108 pinned at 109 to the rear side of a lever 110 is urged counterclockwise by a spring 111 so that the lower end thereof is engageable by the power lug 106. Therefore when the cam K1 rotates it serves to rock lever 100 clockwise which through the link 103 serves to pull bellcrank lever 104 clockwise. Lug 106 by engaging the lower end of pawl 108 thus drives the lever 110 clockwise. Lever 110 is coupled at its upper end by a link 112 with a restoring slide 113 which is slidably supported on the shaft 64 which as previously described supports the upper end of the carriage. Each end of slide 113 is provided with a downwardly extending portion having slots cut therein which are adaptable to the frame 71 to hold the slide 113 against rotation on shaft 64. It is thus seen that the clockwise rotation of lever 110 serves to drive slide 113 to the right. Such rightward movement of slide 113 brings the right end of the slide into engagement with the upper left end of the carriage 62 and hence the carriage is positively driven to the right to its home position.

As the carriage 62 is being driven to the right toward its home position the lower front ends of the tails on the pawls 70 successively engage the left end of the lug 71A on frame 71. The left end of said lug 71A is chamfered so that a camming action with the pawls occurs and hence each pawl is rocked counterclockwise as a result of the homeward movement of the carriage 62. Such counterclockwise movement of each pawl causes the pawl to release the associated indicator bar which then is pulled downwardly by the associated spring 59 to its lowered position.

To prevent a sudden impact of the carriage with the right stationary frame a spring 116 (FIG. 2) is disposed about shaft 64 between the right edge of the carriage and the stop element 117 which is also slidable on shaft 64. The spring 116 is compressed by the carriage as it is driven to the right to serve as a brake element to bring the carriage to a more gradual stop. As previously described the escapement mechanism includes the escapement slide 90 which undergoes rightward movement during an escapement operation. To insure that the slide 90 is restored to its leftward or home position on studs 91 and 92 when the carriage is returned to the right to its home position, a small bellcrank lever 119 is pivoted on stud 91 at the right end of the shaft 64 with a rearwardly extending lug 119A thereof being engaged with the forked end provided on the lower right end of slide 90 (FIG. 7). As the carriage nears its home position the stop element 117 on shaft 64 engages the upper end of bellcrank lever 119. Thus bellcrank lever 119 is rocked clockwise and serves to drive the slide 90 to the left. This insures proper positioning of the carriage as well as the slide 90 for a subsequent amount entering operation.

In the indexing device of the present invention the mechanism shown in FIGS. 2 and 6 is operable to elevate each of the indicator bars to their "9" positions after the add racks have been limited in their rearward travel. Immediately thereafter the indicator carriage can start its travel toward home position and hence there will be a relatively long time interval in the machine cycle for restoring the carriage.

A slide 121 (FIG. 2) having a rightwardly extending arm 122 integral therewith is supported by stud and slot connections for movement in a vertical plane. The right end of the arm 122 is disposed in a slot provided in the vertical shaft 123 on block 75 to provide a parallel motion for the arm 122 as the slide 121 is elevated. As seen in FIG. 3 the arm 122 is provided with a right-angle portion, the upper front edge of which is engageable with a ledge or notch provided on the rear surface of each of the indicator bars. When the slide 121 is elevated each of the indexed indicator bars to the left of lug 71A of frame 71 will be driven to its "9" position. The respective latching pawls associated with the indicator bars will then serve to hold the bars in the "9" position so that the carriage and bars can be driven to the right toward home position without any interference between the lower ends of the indicator bars and the add racks. Thereafter as the carriage is driven to its home position the engagement of the tails on pawls 70 with the lug 71A will cause release of each bar 69 for downward movement to home position under the urge of its spring 59.

A crank 124 pinned to the right end of a shaft 126 and pinned to the right side of slide 121 (FIG. 2) serves to elevate the slide 121 in response to counterclockwise movement of shaft 126. The mechanism for driving the shaft 126 is shown in FIGS. 2 and 6 and includes a lever 127 pinned to the left end of shaft 126 and to the front end of a power slide 128. A control pawl 129 pinned to the right side of slide 128 serves to selectively couple slide 128 with a cam driven slide 130 carrying a roller 131. Slide 130 is spring urged rearwardly so that roller 131 is engaged with the cam K2 on shaft 99. The slide 130 is thus reciprocated forwardly and rearwardly each time the main driveshaft of the machine is driven through a cycle of operation. Therefore if the pawl 129 is held in the position indicated in FIG. 6 the leftwardly extending stud 130A on slide 130 will engage pawl 129 and cause the shaft 126 to be rocked counterclockwise. The stud 128A extending to the right from slide 128 to support pawl 129 is disposed in the open slot near the lower front end of slide 130 so that shaft 126 is always pulled back to its initial position at the end of the rotation of the accounting machine shaft 99. A control cam 132 pivoted at 133 is provided with an upper arcuate surface which engages the forwardly extending end 129A of the pawl 129. Spring 134 serves to urge the pawl 129 in a counterclockwise direction to maintain the forwardly extending portion 129A in engagement with the control cam 132. A spring 135 connected to a stationary stud and to a rearwardly extending stud on cam 132 operates as a toggle to maintain the cam 132 in either of two positions. The position of the cam 132 is determined by manually operable control means (not shown), which in turn determines the position of pawl 129. The cam 132 is normally in its most clockwise position so that the pawl 129 is normally held in its most counterclockwise position where it is engaged with the stud 130A. Therefore during a normal amount entering cycle of operation the indexed indicator bars will be elevated to their "9" positions after the add racks have moved to their differential positions, but prior to the time that the cam K1 drives the carriage to its home position.

In many types of operations it is desirable to retain the amount established in the indicator unit throughout an amount entering cycle of operation, as for example in repeat operations. In such operations the control cam 132 is moved counterclockwise so that the stud 130A by-passes the pawl 129 and therefore does not cause the indexed indicator bars to be elevated to their "9" positions. During such operations the drive for restoring the carriage is also disabled. To this end the control cam 132 carries a rearwardly extending stud 132A which underlies a leftwardly extending portion of the pawl 108 carried by the lever 110. Accordingly when the cam 132 is moved to its counterclockwise position the pawl 108 will be rocked clockwise to a position where the power lug 106 on the bellcrank 104 will by-pass the downwardly extending portion thereof. Thus when the cam 132 is moved to its counterclockwise position the restoring of the carriage as well as the elevation of the indicator bars to their "9" positions will be prevented. The cam 132 can be manually positioned, and also may be preferably positioned by a repeat operation control key. It can also be controlled by a total or subtotal key so that the amount indexed in the indicator unit can be retained during a total or subtotal cycle of operation.

During a total or subtotal operation the add racks must be limited by the register and therefore if an amount in the indicator unit is to be retained during a total or subtotal operation the lower ends of the indicator bars must be moved out of the path of travel of the add racks. As is common in the art, the carriage 62 carries a plate 150 which is provided with downwardly extending lugs for preventing rearward travel of the higher order add racks during a normal amount entering cycle of operation. As seen in FIG. 2 the plate 150 is supported at its right end by means of a forwardly extending portion of the lower frame of carriage 62 in a manner such that the plate 150 can be elevated. In the particular embodiment illustrated the forwardly extending portion of the frame 61 of carriage 62 has a T-shaped slot cut therein and the right end of the plate 150 carries a T-shaped lug which rides in said slot. The left end of the plate 150 is carried by forwardly extending studs 160A and 160B on a vertically movable slide 160 described hereinafter. Since the plate 150 would prevent a proper total operation means is provided for moving the carriage (and hence the plate 150) one-half step to the right during a total or subtotal operation which is performed with an amount in the indicator bars. The add racks will thus pass between the lugs on the plate 150 and between the lower ends of the indexed indicator bars when a total is taken with an amount in the indicator unit.

A slide 151 positioned adjacent to and immediately in front of the slide 121 is also supported by stud and slot connections for movement in a vertical plane. As seen in FIG. 7 the upper end of the slide 151 is provided with a cam slot which encompasses a rearwardly extending stud 152 on the escapement slide 90. The shape of the cam slot is such that if the slide 151 is elevated the stud 152 will move to the bottom of the cam slot and in so moving the escapement slide 90 together with the carriage 62 will be moved one-half step to the right. The mechanism for elevating the slide 151 is shown in FIGS. 2 and 6 and includes a lever 154 secured to and forming the right end of a bellcrank lever 155 which is in turn rotatably supported by the shaft 126. The rear end of lever 154 encompasses a rightwardly extending stud 151A (FIG. 7) on the slide 151. The slide 151 is spring urged downwardly and hence the levers 154 and 155 are normally maintained in a clockwise position as seen in FIG. 2. The bellcrank lever 155 carries a roller 155A at its upper left end, said roller being normally disposed to the right of the front end of a power side 156 which extends through a slot in the frame 71. A cam K3 secured to the main driveshaft 99 of the accounting machine is constantly engaged with the roller provided on the right rear end of the slide 156 since slide 156 is spring urged rearward. Therefore the slide 156 is reciprocated forwardly and rearwardly in response to the rotation of the main accounting machine driveshaft through its 360° of rotation. The shape of cam K3 is such that it operates slide 156 very early in the rotation of the accounting machine driveshaft 99 (prior to rearward travel of the add racks). The bellcrank lever 155 is adapted for sliding movement on the shaft 126 and therefore if it is moved to the left to bring the roller 155A into alignment with the front end of slide 156 the bellcrank lever 155 will be driven counterclockwise when shaft 99 rotates. As a result the slide 151 will be elevated and the carriage 62 will be moved one-half step to the right. Thereafter the add racks will be free to move rearward to positions controlled by the register 65. The position of the bellcrank lever 155 may be controlled in a number of ways, as for example by a manually operable lever or in response to the operation of the total and subtotal keys.

The crank 124 secured to the right end of the shaft 126 which serves to operate the slide 121 for elevating the indicator bars to their "9" positions prior to the driving of the carriage 62 to its home position further serves to operate the vertical slide 160 (FIG. 2). The slide 160 is spring urged downwardly so that the upper right edge thereof is maintained in engagement with the upper surface of the crank 124 which acts as a cam for controlling the position of the slide 160. Slide 160 is provided with the previously mentioned forwardly extending studs 160A and 160B which pass through separate horizontal slots in the plate 150 and therefore serve to support the left end of said plate 150. As previously mentioned the right end of the plate 150 is supported by the carriage 62 in a manner such that the plate 150 can move vertically with respect to the carriage. Accordingly it is seen that when the slide 160 is elevated in response to the counterclockwise rocking of the shaft 126 and crank 124 the plate 150 will be elevated. Therefore the lugs on plate 150 will not interfere with the add racks as the carriage is driven homeward. A bellcrank lever 161 which is urged counterclockwise by a spring 162 has a latching surface which is engageable with the forwardly extending stud 160C on the slide 160. The arrangement is such that as soon as the slide 160 is elevated the latch 161 rocks counterclockwise to a position where it holds said slide 160 (and hence the plate 150) in an elevated position. The plate 150 has a rearwardly extending stud 150A which engages the upper front end of the bellcrank lever 161 when the carriage 62 reaches its home or right-hand position. This engagement of the stud 150A with the bellcrank lever 161 serves to rock it clockwise to release the slide 160 which then returns under spring power to its lowered position. Accordingly the plate 150 is returned to its lowered position where it will again serve to prevent rearward travel of the add racks.

There has thus been described an improved indicating and add rack limiting mechanism for a ten key calculating machine. The improved mechanism provides a visual indication of the amounts indexed by the operation of numerical keys and also serves to limit the travel of the calculating machine's add racks. The improved mechanism provides a simplified construction, particularly in view of the fact that a single element is used for each order to limit the movement of an add rack and to provide a visual indication of an amount. The mechanism disclosed in the preferred embodiment illustrated herein has a further advantage in that the effort required by the operator in depressing the numerical keys is materially reduced over that required in prior art devices since a power means is utilized to drive the rack limiting and indicating elements to their proper positions. By using such a power mechanism for driving the parts to their positions the speed of the device is found to be sufficiently fast so that an indicator bar is moved and latched in the proper position prior to the time that an operator can remove her finger from an operated key. Accordingly the improved amount entering mechanism increases the speed with which successive numerical keys can be depressed. Since the operator merely triggers the mechanism which controls the operation of the parts, including the escapement of the carriage, the length of time that the key is held depressed cannot affect the operation of the device.

What is claimed is:

1. A numerical input mechanism for a calculating machine comprising in combination: a plurality of numerical keys; a movable carriage; a plurality of individually variably movable devices supported by said carriage and movable therewith; spring means urging each of said devices toward a first position in said carriage; a means for driving said movable devices from said first position, yieldable coupling means, electromechanical power means coupled to said drive means by said coupling means and controlling the movement of said drive means; said power means operable in response to the operation of each of said keys; and limiting means controlled by said keys and operable to limit the extent of movement of said devices from their said first positions by said power means.

2. A numerical input mechanism as set forth in claim 1 wherein each of said movable devices includes add rack limiting means and indicator means for displaying a numerical representation of the position assumed by said device.

3. A numerical input mechanism as defined in claim 1 and including means controlled by said power means for holding an operated limiting means in an operated condition until one of said movable devices has been limited thereby.

4. A numerical input mechanism as defined in claim 1 wherein said power means includes a power roll and a driving device selectively engageable therewith upon the operation of a numerical key.

5. An add rack limiting and visual indicating mechanism for an accounting machine having a plurality of add racks therein comprising in combination: a plurality of numerical keys; a plurality of add rack limiting bars; a carriage supporting each of said bars for individual movement; spring means urging each of said bars toward a first position; means for driving said bars from said first position; electromechanical power means yieldably coupled to and controlling the movement of said driving means; said power means responsive to the operation of said numerical keys; a plurality of limiting members each responsive to the operation of one of said keys for limiting the distance which an operated bar can move from its said first position; and pawl means operable to hold each of said bars in its moved position against the urge of said spring means.

6. A numerical control and indicating mechanism comprising in combination: a plurality of numerical keys; a plurality of control bars each having a plurality of numerical indicating surfaces and a control surface; a carriage supporting said bars for individual movement in a first direction and simultaneous movement in a second direction; common bar driving means having a home position and being sequentially engageable upon movement therefrom with each of said control bars; a plurality of bar limiting slides each responsive to the operation of one of said keys for movement to a bar limiting position; and single cycle power means responsive to the operation of said keys to drive said bar driving means from its home position and to hold one of said bar limiting slides in an operated position until it is engaged by one of said bars.

7. A numerical control and indicating mechanism as defined in claim 6 and including an escapement means operative in response to movement of one of said bars in said first direction to move said carriage through a first distance in said second direction and operative in response to the return of said bar driving device to its home position to move said carriage through a second distance in said second direction.

8. A device of the class described comprising in combination: a plurality of numerical keys; a power roll; power transfer means selectively engageable with said power roll in response to the operation of said keys; a plurality of differentially movable control members; carriage means supporting said control members; spring means urging each of said members toward a first position in said carriage; a drive member engageable with said control members and yieldingly coupled with said power transfer means for driving one of said control members from its said home position upon operation of a numerical key; a plurality of limiting means operable by said keys for controlling the distance which each of said control members moves from its home position under the drive of said drive member; and pawl means adapted to hold each of said control members in its moved position.

9. A control mechanism for a ten key calculating machine comprising in combination: a plurality of numerical keys; a movable carriage; first spring means urging said carriage in a first direction; a plurality of individually variably movable limiting devices in said carriage; second spring means urging each of said devices to a home position in said carriage; a plurality of pawls supported by said carriage; means urging each of said pawls toward engagement with an associated device to prevent movement thereof toward said home position; single cycle power means responsive to the operation of each of said keys to yieldingly urge one of said devices away from its home position; means responsive to the operation of said keys for controlling the extent of movement of said one device from its home position; escapement means associated with said carriage and responsive to the movement of said one device from its home position to move said carriage in a first direction; and stationary frame means holding each of said pawls away from its associated device and adapted to sequentially release said pawls as said carriage moves in said first direction.

10. A numerical indicating and add rack limiting mechanism for an accounting machine comprising in combination: a plurality of indicating bars each having an add rack controlling portion and a plurality of numerical indicating surfaces; a carriage having a home position and adapted to support each of said bars for individual variable movement; spring means urging each of said bars to a first position; a plurality of pawls each engageable with one of said bars for preventing movement thereof toward said first position; power means including a lever engageable with one of said bars and operable to drive said one bar in a direction away from said first position; manually operable means for selectively energizing said power means; bar limiting means operable by said manually operable means for controlling the distance which an operated bar moves from its said first position in response to said power means; escapement means operable to move said carriage one step away from its said home position in response to each operation of said manually operable means; and stationary cam means maintaining each of said pawls non-operative when said carriage is in its home position and adapted to release a pawl for engagement with an associated bar as said carriage moves from its home position.

11. Control means for an accounting machine comprising in combination: a movable carriage; a plurality of limiting bars supported by said carriage for individual variable movement; first spring means urging each of said bars toward a first position; an escapement slide engageable with one of said bars to hold said carriage against movement in a first direction; a plurality of control keys; power means responsive to the operation of each of said keys for driving said one of said bars from its said first position; means controlled by said keys and engageable by said one bar to limit the extent of movement of said bar from its first position; means holding said one bar in its moved position; spring means operable upon movement of said one bar from its first position to move said carriage in said first direction and to move said slide in a second direction opposite to said first direction; latch means operable upon movement of said slide in said second direction to hold said slide against movement in said first direction; and means controlled by said power means for releasing said latch means.

12. A numerical control mechanism for an accounting machine comprising in combination: a plurality of numerical keys; a movable carriage having a home position; a plurality of individually variably movable control elements supported by said carriage, said elements being arranged in an ordinal array with the highest order element being in a first position when said carriage is in its home position; spring means urging each of said elements in a first direction; numerical indicating means responsive to the movement of said elements to provide a visual indication of the position thereof; a power roll; rotatable cam means; means responsive to the operation of each of said keys to engage said cam means with said roll; a driving lever responsive to the operation of said cam means by said power roll to move said element which is in said first position in a second direction opposite to said first direction; limiting means responsive to the operation of said keys to limit the extent of movement of said element in said second direction; carriage escapement means operable to cause stepwise movement of said carriage from its home position; and latch means operable to prevent movement of said element in said first direction.

13. A numerical indicating and add rack limiting mechanism for an accounting machine comprising in combination: a plurality of numerical keys; a movable carriage; first spring means urging said carriage in a first direction; an indicating and add rack limiting bar supported in said carriage; second spring means urging said bar in a second direction; power means responsive to the operation of said keys to drive said bar in a third direction opposite to said second direction; means responsive to the operation of said keys to limit the extent of movement of said bar to an amount representative of the operated key; an escapement slide having means thereon engageable with said bar for holding said carriage against movement in said first direction and adapted to release said carriage for movement in said first direction in response to movement of said bar in said third direction; means operative to move said slide in a fourth direction opposite to said first direction when said bar is moved in said third direction; latch means operable upon movement of said slide in said fourth direction to hold said slide against movement in said first direction; and means responsive to the completion of the operation of said power means to release said latch means from said slide to thereby render said first spring means operable to move said carriage and said slide in said first direction.

14. A power operated numerical input mechanism for an accounting machine comprising in combination: a plurality of individually operable numerical keys; a power driven roll; a driving cam engageable with said roll; first latch means holding said cam disengaged from said roll; a control frame movable from a first position to a second position by each of said keys and operable upon movement to said second position to disable said latch means; a movable carriage; a plurality of individually variably movable indicator bars supported in said carriage and each including add rack limiting means; a plurality of pawls supported by said carriage and each associated with one of said bars; spring means urging each of said bars in a first direction and each of said pawls toward engagement with an associated bar, said pawls when engaged with an associated bar preventing movement thereof in said first direction; bar driving means having a home position and coupled with said cam for driving one of said bars in a second direction opposite to said first direction; a plurality of slides individually movable from a first to a second position by one of said keys and each operable in its second position to limit the extent of movement of one of said bars; second latch means controlled by said cam and operative to hold an operated slide in its second position until said slide is engaged by said one bar; and escapement means operable upon movement of said one bar in said second direction to move said carriage in a third direction.

15. An input mechanism as defined in claim 14 wherein said escapement means includes an escapement slide supported for movement in said third direction; spring means urging said carriage in said third direction and said escapement slide in a fourth direction opposite to said third direction; means associated with said escapement slide engageable with one of said bars for holding said carriage against movement in said third direction and adapted to release said carriage for movement in said third direction and said escapement slide for movement in said fourth direction in response to movement of a bar in said second direction; third latch means holding said escapement slide against movement in said third direction in response to movement of said escapement slide in said fourth direction, and means releasing said third latch means upon return of said bar driving means to its home position.

16. A control mechanism for an accounting machine comprising in combination: a plurality of numerical keys; a plurality of control elements; carriage means supporting each of said elements for individual variable movement in a first direction; a plurality of limiting elements each operable by a key to limit the extent of movement of one of said control elements in a first direction; power means including an electric motor and a drive apparatus coupled therewith and operable by each of said keys to drive one of said control elements in a first direction and to hold one of said limiting elements in its operated position; carriage escapement means operable to cause stepwise movement of said carriage in a second direction orthogonal to said first direction; a plurality of latching pawls carried by said carriage; and spring means urging each of said control elements in a third direction opposite to said first direction and each of said latching pawls toward engagement with one of said control elements to prevent movement thereof in said third direction.

17. A control mechanism for an accounting machine as defined in claim 16 and including power means operable to drive said carriage in a fourth direction opposite to said second direction, and pawl control means moving each of said pawls away from its associated control element as said carriage is moved in said fourth direction and sequentially releasing each pawl for engagement with its associated control element as said carriage moves in said second direction.

18. A control mechanism for an accounting machine as defined in claim 16 and including power means operative to move each previously operated control element to its position of maximum displacement in said first direction.

References Cited in the file of this patent

UNITED STATES PATENTS

| | | |
|---|---|---|
| 2,352,006 | Pott | June 20, 1944 |
| 2,681,765 | Hopkins et al. | June 22, 1954 |
| 2,894,682 | Arvai | July 14, 1959 |
| 2,922,574 | Matthew | Jan. 26, 1960 |
| 2,945,622 | Heinze et al. | July 19, 1960 |
| 3,044,697 | Gang | July 17, 1962 |
| 3,093,304 | Starrett | June 11, 1963 |